Oct. 21, 1941.  A. A. ANDERSEN  2,259,983
INTERNAL COMBUSTION MOTOR
Filed Feb. 5, 1940  2 Sheets-Sheet 1

INVENTOR.
ARTHUR A. ANDERSEN
BY Arthur L. Mack
ATTORNEY.

Oct. 21, 1941.　　　A. A. ANDERSEN　　　2,259,983
INTERNAL COMBUSTION MOTOR
Filed Feb. 5, 1940　　　2 Sheets-Sheet 2
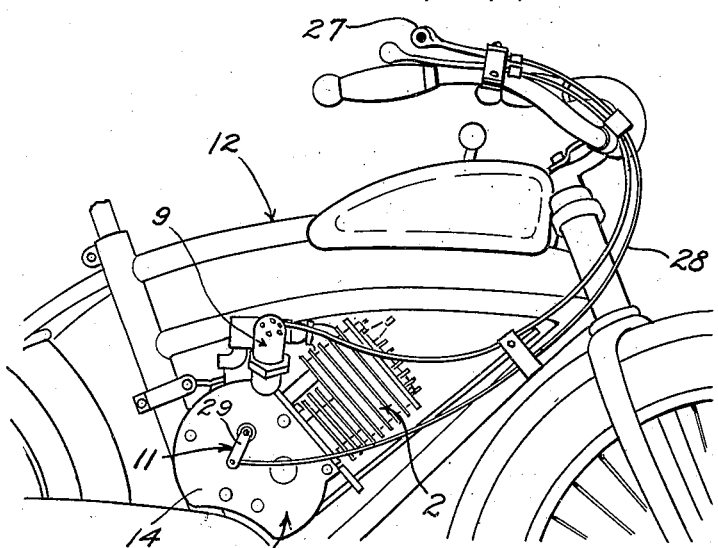
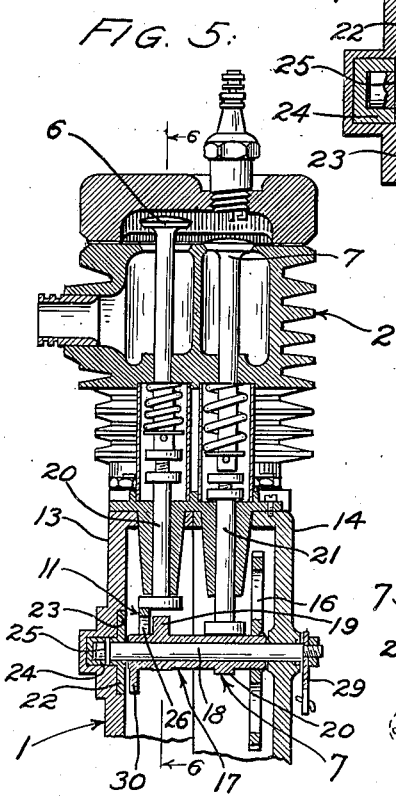
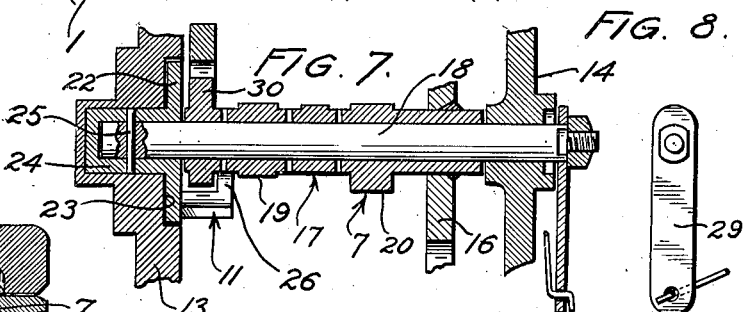
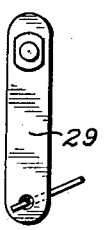
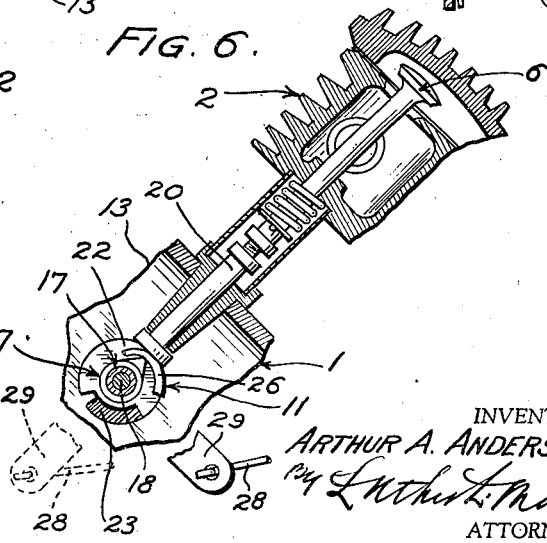
INVENTOR.
ARTHUR A. ANDERSEN
ATTORNEY.

Patented Oct. 21, 1941

2,259,983

UNITED STATES PATENT OFFICE 2,259,983

INTERNAL COMBUSTION MOTOR

Arthur A. Andersen, Los Angeles, Calif., assignor to Breene-Taylor Engineering Corporation, Los Angeles, Calif., a corporation of California Application February 5, 1940, Serial No. 317,337

4 Claims. (Cl. 123—182)

The present invention relates to improvements in internal combustion engines and more particularly to an engine for forming a part of a bicycle motorizing unit such as disclosed in my application for patent Serial No. 267,792 filed April 15, 1939.

In consideration of the use of the motor of my invention for motorizing bicycles and propelling light vehicles, etc., the primary purpose thereof is to provide a small compact motor which will be light as to weight, readily attachable and detachable, economical in operation and characterized by features of novel construction and arrangement making for the development of a high power factor and an efficient operation in consideration of its comparatively small size.

One of the purposes of my invention is to provide a novel oil pumping and lubricating system for a small compact motor of the character described, wherein the arrangement and construction of the oil pump, its operating means and associated parts are novel and make for economy of space, and a reliable and efficient lubricating system.

Another purpose of the invention is to provide in a motor of the character described a novel and highly efficient compression release mechanism for starting and stopping the motor.

A further purpose is to provide a motor of the character described having a novel cam shaft mechanism wherein cams for operating the exhaust valve, intake valve, ignition timer, and oil pump are made up as one unit, said cam mechanism also including a part of the compression release mechanism.

Another purpose is to provide a motor such as described wherein all of the parts of the pump, cam mechanism, compression release and associated device and element may be conveniently assembled in one of the parts of a divided crankcase.

Another purpose is to provide an engine such as described wherein a combined oil filler and breather for the crank case is provided with a novel valve designed to maintain a sub-atmospheric pressure in the crank case and thereby eliminate small oil leaks.

With the foregoing and other objects in view, the invention consists in the combination, correlation, relative arrangements and construction of the parts and elements as will be described in the following specification illustrated in the accompanying drawings and finally recited in the claims hereto appended. It is to be understood that various changes as to minor details of construction and arrangement may be resorted to as required without departing from the spirit and scope of the invention as defined in the claims hereto appended.

Referring to the drawings:

Figure 4 is a fragmentary side elevation of a bicycle as when equipped with a motor embodying my invention;

Figure 5 is a fragmentary vertical section taken on the plane of line 5—5 of Figure 1, and showing the cam mechanism for operating the valves and pump, also the exhaust valve lifting means for relieving compression;

Figure 6 is a section on the plane of line 6—6 of Figure 5 particularly showing the exhaust valve lifting means as when in compression releasing position;

Figure 7 is an enlarged fragmentary horizontal section of the cam mechanism and associated elements;

Figure 8 is an elevational view of the operating lever for the compression releasing means.

Figure 2:
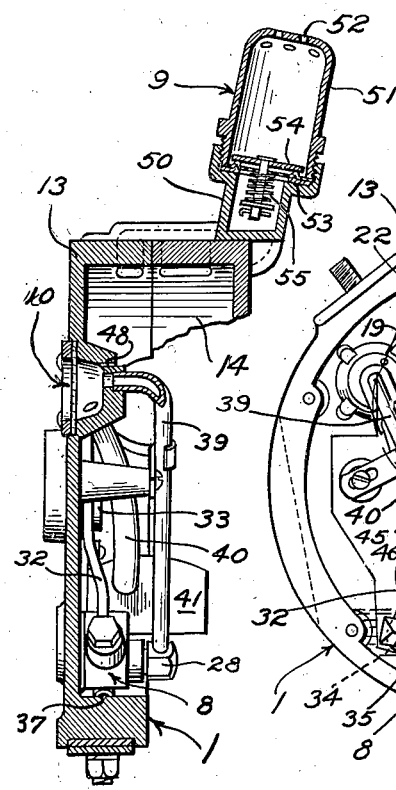
Figure 2 is a vertical section on the plane of line 2—2 of Figure 1, particularly showing the oil pumping system and the valved breather.

One form of internal combustion engine embodying my invention, as shown in accompanying drawings, generally comprises a crank case 1, cylinder 2, piston 3, piston rod 4, crank shaft 5, exhaust valve 6, intake valve 7, cam mechanism 7' for operating the valves, oil pump 8 driven from said cam mechanism, valved crank case breather 9, sight gage 10 for the lubricating system and compression releasing means 11, associated with the cam mechanism.

The engine is designed for motorizing a bicycle such as the one 12 shown in Figure 4, but obviously may be put to any use to which it is suited. When employed as shown in Figure 4, it takes up a comparatively small space on the main frame of the bicycle, and is but slightly wider than the bicycle, taking up less room transversely than the space between the pedal cranks, not shown. The manner of mounting the engine and drivingly connecting it with the bicycle is fully disclosed in my former application hereinbefore identified, and forms no part of the present invention.

As here shown the crankcase 1 is generally circular and formed of similar halves or sections 13 and 14 removably bolted together and to which the cylinder 2 is removably secured so as to be inclined from the vertical, in order that it may be best secured in the V frame of the bicycle as shown in Figure 4.

The cam mechanism is assembled in the section or half 13 of the crank case and includes a drive pinion 15 keyed on the crank shaft and meshing with a driven gear 16 fixed to a tubular cam shaft 17. This cam shaft is rotatably supported on a shaft 18 suitably journalled at its ends in opposite walls of the crank case as shown in Figure 5. On the cam shaft is a cam 19 for operating the exhaust valve pusher rod 30 and a cam 20' for operating the rod 21 of the intake valve.

The compression release means of my invention, best shown in Figure 7, comprises a circular disk 22 seated for rotation in a recess 23 in the side wall of the crank case section 13 and having a tubular hub portion 24 in which the shaft 18 is mounted. A pin 25 secures the shaft 18 and portion 24 for joint rotation. On the outer face of the disk 22 is an arcuate valve lifter 26 concentric with the shaft 18 and adapted to be moved into and out of position for engaging and lifting the pusher rod 29 of the exhaust valve as shown in Figures 5, 6, and 7.

For stopping the motor or to facilitate the starting thereof, the exhaust valve is lifted to release compression. This may be accomplished by means of a lever 27 on the bicycle, connected by a Bowden wire control 28 with a crank arm 29 fixed on the extended end of shaft 18, as seen in Figures 4, 5, 6, and 7. When the lever 27 is operated the shaft 18 will be turned and will move the disk 22 whereby the arcuate lifter 26 will be swung from out-of-the-way position shown in Figure 7, to valve lifting position shown in Figures 5 and 6. The lifter will remain in this position as long as the lever 27 is depressed, but will swing back to position, shown in Figure 7 by the action of a spring (not shown), associated with the control 28, when the lever 27 is released, and the exhaust valve will then be free to close whereby the desired compression may take place in the cylinder.

Figure 3:
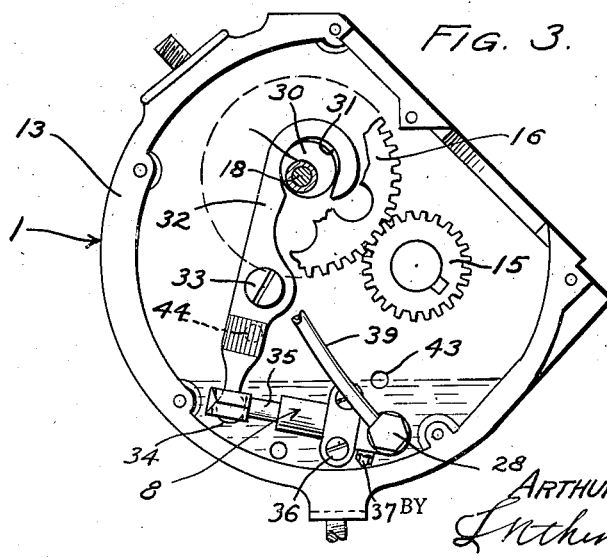
Figure 3 is a side elevation of one section or half of the crank case particularly showing the drive means for the oil pump, certain parts being omitted for clarity of illustration.

Mounted on the cam shaft between the cam 19 for the exhaust valve and the disk 22, is an oil pump operating cam 30 which is circular and eccentrically mounted and engaged in a circular opening or seat 31 formed in the upper end of an oscillating drive lever 32 as shown in Figure 3. This lever is pivoted between its ends as at 33 to the crank case section 13 and at its lower end has a ball and a socket or similar flexible connection 34 with the piston rod 35 of the oil pump 8, said pump being secured by fastening devices 36 near the bottom of the crank case.

Figure 1:
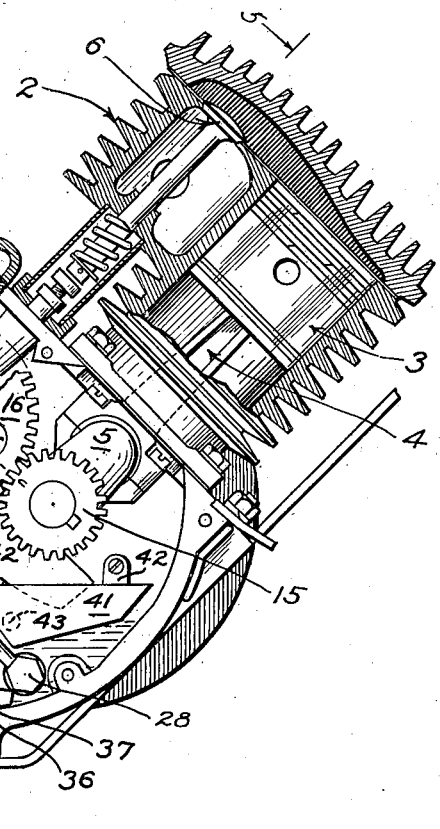
Figure 1 is a vertical or a side elevation in part in section, of a motor embodying my invention, one side or section of the crank case being removed.

As shown in Figure 3, the pump 8 has an intake opening 37 on its lower side, and a discharge nipple 28 on its upper side with which latter an oil feed pipe 29 is connected. The pipe 39 leads, as shown in Figure 1, to the sight gage 10 and from said gage a pipe 40 leads to an oil splash pan 41. The pan 41 is supported by a bracket 42 in such position that the throw of the crank shaft will pass through the body of oil therein during rotation of said shaft. In the case is a low level oil plug 43 and a similar high level plug 44 is also provided in the crank case. Oil up to or between these levels in the crank case will provide for effective lubrication without waste.

As shown in Figure 1, the pipe 40 is provided between its ends with an outlet opening 45 to by-pass oil into the crank case to avoid over-filling of the pan. A part of the pipe 40 adjacent the opening 45 is bent inwardly to act as a deflector 46 (see Fig. 1) whereby the oil stream in pipe 40 is divided at the deflector and part thereof directed outwardly through said opening. To prevent this by-passed oil from being discharged into the pan another deflector 47 is placed exteriorly of and adjacent the opening 45, as shown in Figure 1.

It is noted that the sight gage is formed as a Celluloid covered pocket in the crank case section 13 and has an air vent 48 on its upper side. The oil feed is visible on the outside of the crank case, as particularly shown in Fig. 2.

The breather 9 is mounted exteriorly of the upper side of the crank case section 14 and includes a tubular fitting 50 removably secured to said section and communicating with the interior of the crank case. Screwed onto this fitting is a cap 51 having a perforated outer end 52 for escape of fumes from the crank case. The fitting 50 is counterbored and provided with annular seat 53 for a disk valve 54 which is urged inwardly against its seat by a spring 55. The spring is of such strength that upon the down stroke of the piston of the engine the valve will open but slightly and momentarily to permit escape of compressed gas or air in the crank case, then remain closed. On the up strokes of the piston the valve remains closed and a slight vacuum say of two inches of water is created in the crank case. Due to the slight opening of the valve it is seen that the engine will operate with a slight vacuum in the crank case substantially at all times whereby to prevent oil leaks, and especially through the breather 9. The oil is supplied to the crank case through the breather as is customary in the art.

It is important to note that substantially all of the parts and elements which control the operation of the engine excepting the cylinder piston and intake and exhaust valves, and the breather, are assembled in one side or section, the one 13 of the crank case. The other side or section 14 carries exteriorly only, but two parts, the breather 9 and the crank arm 29 on the shaft 18 for operating the compression release mechanism. Thus it is seen that the motor may be quickly and easily assembled and disassembled.

It is now seen that by reason of the particularly constructed and arranged parts and elements of my invention I am able to provide a small, light and comparatively powerful four cycle motor which is especially adapted for attachment to and the operation of bicycles.

I claim:

1. In an internal combustion engine a crank case, a crank shaft therein, an exhaust valve, a shaft rotatably supported by and between opposed walls of the crank case, a valve lifting means on the second named shaft operable for lifting and maintaining said valve in open position upon predetermined rotation of the second named shaft, manually operable means for rotating the second named shaft, said valve lifting means including a disk rotatably seated in one of said walls and fixed to the second named shaft, and an arcuate valve lifting member extending laterally from and carried by said disk.

2. In an internal combustion engine a crank case, a crank shaft therein, an exhaust valve, a shaft rotatably supported by and between opposed walls of the crank case, a valve lifting means on the second named shaft operable for lifting and maintaining said valve in open position upon predetermined rotation of the second named shaft, manually operable means for rotating the second named shaft, a tubular cam shaft rotatably supported by the second named shaft, drive gearing connecting the crank shaft with the cam shaft for rotating the latter, and an exhaust valve cam on the cam shaft arranged to operate such valve only when the valve lifting means is in inoperative position.

3. In an internal combustion engine a crank case, a crank shaft therein, an exhaust valve, a shaft rotatably supported by and between opposed walls of the crank case, a valve lifting means on the second named shaft operable for lifting and maintaining said valve in open position upon predetermined rotation of the second named shaft, manually operable means for rotating the second named shaft, said valve lifting means including a disk rotatably seated in one of said walls and fixed to the second named shaft, an arcuate valve lifting member extending from and carried by said disk, a cam shaft in said crank case, drive gearing connecting said crank and cam shafts, and a valve operating cam on said cam shaft arranged to operate the valve when the valve lifting member is disposed out of valve lifting position.

4. In an internal combustion engine a crank case, a crank shaft therein, an exhaust valve, a shaft rotatably supported by and between opposed walls of the crank case, a valve lifting means on the second named shaft operable for lifting and maintaining said valve in open position upon predetermined rotation of the second named shaft, manually operable means for rotating the second named shaft, said valve lifting means including a disk fixed to the second named shaft, and an arcuate valve lifting member extending from and carried by said disk, a tubular cam shaft rotatably supported on the second named shaft, drive gearing connecting the cam shaft with the crank shaft, and a valve operating cam on the cam shaft at a point adjacent and laterally spaced from the cam lifting member and arranged to operate the valve only when the valve lifting member is disposed out of valve lifting position.

ARTHUR A. ANDERSEN.